United States Patent [19]

Lindstrom

[11] 4,330,512

[45] May 18, 1982

[54] METHODS FOR TREATING A GAS FLOW CONTAINING SULFUR OXIDE

[76] Inventor: Olle B. Lindstrom, Lorensviksv 14, S-18363 Taby, Sweden

[21] Appl. No.: 215,875

[22] Filed: Dec. 12, 1980

Related U.S. Application Data

[63] Continuation of Ser. No. 772,562, Feb. 28, 1977, abandoned.

[30] Foreign Application Priority Data

Feb. 26, 1976 [SE] Sweden .................. 7602575

[51] Int. Cl.³ .................... C01B 17/00; B01J 8/00
[52] U.S. Cl. ................................................ 423/244
[58] Field of Search ............ 423/244 A, 244 R, 239, 423/240; 55/73

[56] References Cited

U.S. PATENT DOCUMENTS

| | | | |
|---|---|---|---|
| 931,515 | 8/1909 | Sprague | 423/244 |
| 3,150,923 | 9/1964 | Bienstock et al. | 423/244 |

FOREIGN PATENT DOCUMENTS

| | | | |
|---|---|---|---|
| 1234396 | 10/1960 | France . | |
| 42-26166 | 12/1967 | Japan | 55/73 |
| 334595 | 12/1962 | Sweden . | |
| 844823 | 8/1960 | United Kingdom . | |
| 1112372 | 5/1968 | United Kingdom . | |

OTHER PUBLICATIONS

National Swedish Environment Protection Board, "Flue Gas Desulfurization", 1974: 9E.

*Primary Examiner*—O. R. Vertiz
*Assistant Examiner*—Gregory A. Heller
*Attorney, Agent, or Firm*—Burns, Doane, Swecker & Mathis

[57] ABSTRACT

A gas flow is treated by passing the gas upwardly in a chimney. A plurality of contact elements, coated with a treating agent, are released at the top of a contact zone in the chimney for uniform free falling movement through the rising gas, so that the gas contacts the treating agent.

5 Claims, 1 Drawing Figure

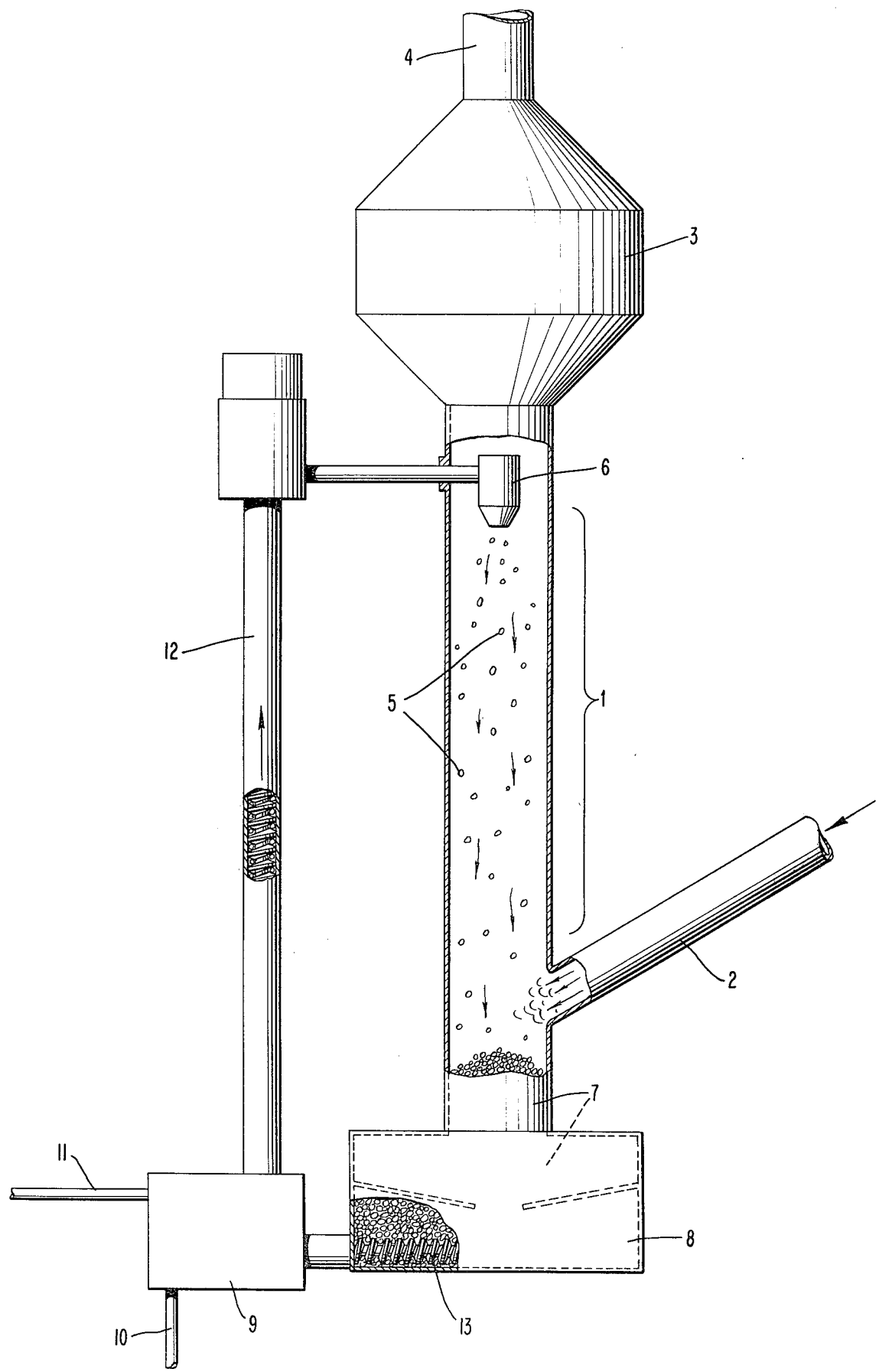

METHODS FOR TREATING A GAS FLOW CONTAINING SULFUR OXIDE

This is a continuation of application Ser. No. 772,562, filed Feb. 28, 1977, and now abandoned.

BACKGROUND AND OBJECTS

The present invention relates to methods and apparatus for treating gas and, more particularly, for removing components from the gas.

Treatment of gas flows for the recovery or elimination of components present in a comparatively small quantity as gaseous compounds, liquid droplets or solid particles or particulate matter is a great problem in many industrial branches. Purification of stack gases from sulphur oxides, nitrogen oxides, hydrochloric acid, particulate matter, etc. is such a typical problem. Another typical example is the purification of synthesis gas from small amounts of impurities like hydrogen sulphide and carbonyl sulphide.

Many processes and apparatuses are described in the literature which utilize different principles of these treatments. Several of these methods are specific for special types of impurities, for instance particulate matter in stack gases, whereas other methods are of a more general nature. The present invention is of a completely general character and can be applied to many different fields with different embodiments within the frame of the invention.

Treatment of a gas flow in general takes place by bringing the incoming gas, i.e., the upstream flow, into contact with a material for treatment, i.e., agent. The agent has the property to take up the matter carried by the gas, which matter is to be eliminated from the gas flow, before it leaves the contact zone as down-stream flow. It is a characteristic feature of this invention that it gives very well defined contact conditions between the incoming gas and the agent, preferably in counter current, which permits as effective a treatment as possible with the least quantity of used up agent.

The present invention has certain points in common with the type of packed towers which are described in the French Pat. No. 1234396 where the packing is a uniform fluidized bed of light balls. The bed of balls is contained in an upper region of the tower where it is retained by means of a grid. The gas is blown through the liquid and the bed of balls whereby a large contact area is generated. Thanks to the strong movement in the bed of balls (which distinguishes this bed from the conventional packed tower) the composition of the liquid will be about the same in the whole active part of the tower.

Attempts have also been made to produce a counter-current flow between liquid and gas in a tower containing light balls of the same kind being used according to the procedure described in the French Pat. No. 1234396. According to the invention, described in the Swedish outlayed patent application 334 595, the balls, the so-called light weight elements, are kept in an uncontrolled movement in a contact zone along linear paths which are longer than any dimension of the elements whereby the volume of the contact zone is at least twice the volume taken up by the elements when they are at rest. This bed is expanded compared to what is described in the French patent referred to above so as to produce a more pronounced counter-current flow. There is, however, a stirring effect when it comes to the liquid phase because of the uncontrolled movement of the balls in the whole contact zone.

Svenska Flaktfabriken, a Swedish company, has developed an apparatus (Flakt Nateko Gasreaktor) which gives a well developed counter-current flow. The agent, in this case a solid material, is disposed on the surface of heavy balls which are being transported through a contact apparatus with decks. The balls are moved from deck to deck in counter-current relative to the gas flow. The agent is eliminated from the balls after the passage through the contact apparatus. The gas is passed through a packed bed of balls on each deck. It is not a long step from this apparatus to the conventional packed tower, which, however, does not permit the use of an agent in a solid state.

The simple scrubber is perhaps still a contactor so far unsurpassed with low pressure drop but it does not lend itself easily to counter-current contact in a simple way.

The processes and apparatuses described above as well as many other processes and means described in the patent literature and in reference books in this field like Pollution Technology Review No. 21, 2nd Ed., have the purpose to satisfy conflicting requirements. These requirements are in particular:

(a) Low pressure drop which is of particular importance in stack gas cleaning.

(b) Counter-current contact between gas and agent which gives a low quantity of impurities in the downstream gas and an effective utilization of the agent.

(c) Almost complete consumption of the agent considering economic and subsequent processes, for instance deposition.

(d) Simple, inexpensive and reliable apparatuses.

The last mentioned requirement may seem trivial but is nevertheless of great importance. The cost for gas purification is frequently the heaviest item in the overall expense of many process systems. It is therefore as justified to try to develop better processes for gas purification as to develop the main processes.

The present invention satisfies the above requirements in a surprisingly simple and efficient manner. The invention can be used for many different applications within the technology of gas purification and gas treatment described in the publications referred to above, and gives thereby great advantages compared to the state of art. The invention gives primarily an effective and well controlled contact between the agent and the gas flow in a simple way. Thanks to this controlled contact the other requirements mentioned above are also satisfied.

BRIEF SUMMARY OF INVENTION

In the present invention gas is conducted upwardly in a contacting apparatus in the form of a tower, column, chimney. Contact elements having a coating of treating agent are released in the chimney for a free and uniform falling movement directed downwards in counter-current with the rising gas flow.

The condition that the contact elements shall fall freely in the gas flow in a uniform way, of course, implies that all elements move in one and the same direction and preferably with the same velocity. The condition for this is that the contact zone takes up a volume which is much greater, or in a limiting case at least twice as great, as the volume taken up by the contact elements when packed in a nonmoving bed. A second condition is that the volume of the agent is much smaller than the total volume of the contact elements, in the limiting case at least less than half the total volume.

THE DRAWING

The FIGURE is a schematic view depicting the interior of a purification tower for carrying out the invention.

DETAILED DESCRIPTION OF PREFERRED EMBODIMENTS OF THE INVENTION

The FIGURE shows a simple tower with a contact zone 1. The up-stream gas is introduced at the intake 2 and is distributed over the flow area of the contact zone. The gas moves upwards through the contact zone 1 which terminates with an expansion part 3. The gas moves on beyond the expansion part through a pipe 4 for further processing, utilization or venting.

The contact elements 5 are introduced into the upper part of the contact zone by means of a dispenser 6. The elements 5 then move downwards in the contact zone and are collected in a collection section 7 to be removed from the tower by means of a extractor 8. The extractor 8 may comprise a rotary screw feeder 13 as shown, or a fluid pump, among other possibilities.

The elements may be discarded and new ones introduced at the top of the contact zone, or the elements 5 can be regenerated.

The FIGURE shows schematically an apparatus 9 for regenerating where used-up agent is removed from the elements 5 via the conduit 10 and a new agent is added via the conduit 11 as is well known. The contact elements are then preferably transported by the transporting riser 12 for a new passage through the contact zone. This may be achieved by a screw feed or a fluid conveyance among other possibilities.

The contact elements according to the present invention describe an ordered movement relative to the gas flow in contrast to what is the case with the inventions described above. The elements may of course occasionally come into contact with each other and with the limiting surfaces of the contact zone. The average distance which an element travels relative to the gas flow between such chance collisions is, however, very large, at least five times the longest dimension of the elements. These chance collisions do not hinder the fact that the contact elements are moving in an almost free and ordered way in the gas flow. The bulk of light weight elements are all the time moving in a piston flow relative to the gas mass. The means according to the FIGURE can therefore be described as a tube reactor of an almost ideal counter-flow. This gives substantial advantages compared to the state of art. The efficiency will be very high since the outgoing down-stream gas passes contact elements with fresh agent before it leaves the contact zone.

The FIGURE shows partly the principle for the invention and partly a specific embodiment. I shall now describe the different elements in the FIGURE each at a time, and thereby describe different possibilities of variation within the frame of this invention.

The FIGURE shows an often preferred embodiment where the contact elements 5 are recirculated to the contact zone after regeneration of the agent or elimination of used-up agent or addition of new agent. In certain cases it may, however, be of advantage to use single pass elements which are subject to destruction or deposition after the passage through the apparatus according to the invention.

Since the elements have to move in a comparatively free way in relation to each other and to the gas mass, mainly due to the action of gravity, the contact zone must permit such a free movement. This, of course, leads naturally to a contact zone designed as a tower or column with a preferably vertical extension.

The contact zone may also contain means for the supply of agent. If the agent is a scrubbing liquor the agent can be sprayed into the contact zone in which case it will soon be taken up by the contact elements and then transported through the contact zone carried by the elements.

It is also possible to supply wash-liquids, for instance with different compositions on different levels, in the contact zone. In this way it is thus possible for instance to vary the pH of the wash liquid at different levels in the contact zone which can be of advantage for instance in the use of ammoniacal solutions for the elimination of sulphur oxides from stack gases. One may also in this way compensate for water evaporation from the wash liquid.

The design of the contact element partly depends on the agent in question. It is frequently preferred to use hollow spheres or balls according to the description in the patent publications referred to above. It is, however, possible to use other shapes like tubes, ellipsoids, rings, etc. The surface of the elements can also be enlarged by porous coatings or coated with active carbon or other absorbents.

The elements must, of course, be made of material which are resistant to the environment in question. Different polymer products like celluoid, polyethylene, polypropylene, etc., as well as resistant metal alloys are suitable because of simple fabrication, low density, and good chemical resistance. It is no difficulty for the artisan to choose the right design material for the elements as well as suitable surface treatment and suitable production method for each particular purpose. The elements of this kind are commercially available for use according to the processes described in the patent applications referred to above.

The agent is frequently a liquid containing reactants for sorbtion and bonding of the substances in question. Particulate matter may also be caught up by liquid agents. It is, however, not a necessary condition for the invention that the agent shall be a liquid even if this is frequently very useful. The agent may also be powder disposed on the elements by means of liquid or in other ways. One may then use a slurry of the agent in a suitable dispersion agent, frequently water. Examples of such solid materials are, for instance, a powder of limestone or lime for the reaction with sulphur oxides in stack gases.

The agent can also be constituted of electric charges which are produced by passing the elements through a strong electric field or an ionized gas mass. The charges can also be generated as so-called friction electricity. In this case the action will correspond to the corresponding action with so-called electrofilters. However, in general, liquids, or solid agents carried by liquids, are very efficient and therefore those types of agents are preferred since they permit simple regeneration and associated treatment of the extracted material.

In the usually preferred embodiment with recirculation of the elements after reconstitution of the agent one may use different known means for the transport. The elements have to be brought to a higher level before the re-introduction into the apparatus. Useful means is here a simple screw feeding the elements after the contact zone which then carries the elements upwards in the transport riser 12 in the FIGURE. The transport can also be carried out by pneumatic means or by introducing the elements in a riser filled with liquid, for instance, by means of the screw feeder or a valve feeder, etc. These organs are with advantage designed so as to simultaneously serve as organs for the reconstitution of the agent on the elements.

The dimensions of the contact elements must, of course, be designed and optimized for every special application. Important input data is the concentration in the up-stream flow of the substance to be taken up by the agent as well as the desired concentration of the same substance in the down-stream flow after the treatment. The agent must be carried by the contact elements during the passage through the contact zone which takes about the same time for all contact elements, that is, the contact time. The contact time, of course, depends on the velocity of the gas flow, the falling velocity of the elements in the gas mass, and the length of the contact zone. The gas velocity in the contact zone is inversely proportional to the section area of the contact zone. The falling velocity is, of course, primarily depending on the size, shape and weight of the elements.

The rate for the uptake of the substance in question by the agent is, of course, an important factor. One is here of course striving to work in the so-called diffusion regime in which the mass transfer from the gas through a gas film adjacent to the surface of the contact element is a rate determining factor. The chemical process (for instance, the neutralization of an acid impurity in a stack gas by the agent, e.g., an alkaline wash liquid) is then so rapid that the concentration of the substance very near the surface of the element is very low. Under these conditions, the procedure according to the invention is of particular advantage compared to the state of art.

One has to put up material balances for the contact zone at large as well as for a small element of the contact zone. One will then see that the amount of contact elements supplied to the contact zone per unit time under the given conditions does not depend upon the shape of the contact zone and furthermore that the amount of elements which are present in the contact zone at the same time does not depend on the shape of the contact zone. The contact time does, of course, depend on the shape of the contact zone as well as of the properties of the contact elements, in particular their apparent average density. One thus has to determine the time which is required for the almost complete consumption of the agent disposed on the element in a successive contact with the gas, the composition of which varies from the upstream specification to the down-stream specification. This contact time can be determined by measurements in model experiments or by means of theoretical calculations when the rate constants for mass transfer and chemical reaction are known.

The most useful shape of the contact element is, in general, the spherical shape among other things depending on the method of fabrication. A smaller diameter gives a combined larger surface counted on the volume of the contact elements as packed in a bed. In extreme cases when one wants to work with as small contact zone as possible and still maintain the valuable advantages of the invention, one may find it suitable to work with very small contact elements with a diameter down to about 0.1 cm or even slightly below. In these cases the contact elements may have a fairly high density which may be well about 1 kg per $dm^3$ and they could then be balls of glass or other particles of mineral origin. In the most frequent applications, however, the contact elements take up a volume which is but a fraction of the volume of the contact zone, frequently below 20%. A common range is 1–10% counted on the volume of all contact elements which are simultaneously present in the contact zone in a hypothetical dense packed bed in relation to the total volume of the contact zone. In such cases one can choose the diameter of the contact elements freely considering the other requirements of the process. The useful diameter of the elements under these conditions is between 0.5–5.0 cm or above. A practical range is frequently 1–2.5 cm. Under these conditions the density of the elements is well below 1 $kg/dm^3$ frequently in the range 0.1–0.7 $kg/dm^3$ whereby a frequently preferred range is 0.2–0.5 $kg/dm^3$. In these cases one may talk about light weight elements. The required density can be obtained by using cheap ballast material, for instance sand, in the elements which preferably are manufactured as hollow balls.

It is frequently suitable to work with comparatively long contact zones. A very interesting possibility is here to make the contact zone as a tubular element or similar means which, in any case are required, for the main processes in question. Such a very common tubular element is chimneys for stack gases and other exhaust gases. The procedure according to the invention can in this case be carried out by introducing the light weight elements in the upper part of the chimney. It is not difficult for the artisan to adapt the procedure according to the invention to different situations and to incorporate known devices and techniques for supplying and removing the contact elements and regeneration of the contact elements.

It is not possible to exemplify the invention by examples taken from the many different areas of application. I shall therefore restrict myself to one application of particular importance that is the elimination of sulphur dioxide and particulate matter from stack gases.

Many different processes have been suggested for the elimination of sulphur oxides from stack gases from power plants using coal or oil. A summarized description of several of these known processes is found in the National Swedish Environment Protection Board publication 1974:9 E. It is possible to use these different agents and processes under the specified conditions for the procedure according to this invention. For simplicity, I shall here choose the simpliest possible agent, that is an aqueous solution of sodium hydroxide. The contact zone is disposed in a large tower which also serves as a chimney. The tower or the chimney can be designed and manufactured according to the technology which has been developed in this area and which is described for instance in Svensk Byggnorm SBN S-68. The gas flow is 75 $m^3$ per sec. Because of the action of the agent, the inner walls must be coated or manufactured of alkali resistant materials. Frequently, it is not permitted to let the stack gas temperature fall below 130° C. to avoid condensation on the chimney walls. Contact elements covered with a film of an aqueous solution, of course, will dry out rapidly in the contact with the hot stack gas. The very thin film of an alkali on the walls reacts with the acid components of the stack gas whereby the corresponding salts are formed. The balls are removed at the bottom of the tower and the salts are washed out or scraped off for deposition for further processing.

The balls are introduced in a riser containing a wash liquid and rise by themselves towards the top of the riser where they are fed over into the contact zone. The riser is connected to a down-column. The column is, in this case, 100 m tall with an area of 3 m$^2$, the column contains simultaneously 3 million light weight elements. Each element has a diameter of 1 cm and has an initial density of 0.45 kg/dm$^3$. The elements are manufactured of polysulfon and the density is adjusted by means of sand ballast. The contact time is 106 seconds.

There are many variations of this embodiment. One variation is to use hydrated lime instead of sodium hydroxide. Another variation is to cool down the stack gas to about 50° C. in a regenerative heat exchanger and carry out the treatment of the stack gas at this temperature in which case the film with the agent does not dry out.

The aim of the above description has been to clarify the spirit of the invention. I have then described some simple applications.

The invention is, however, not restricted to these examples but can be used in the whole field of gas treatment and it should be no difficulty for the artisan to find a useful embodiment for each such processes with the knowledge of the spirit of the invention and by means of data and technical information about the processes in question and one known technique for calculations within chemical technology.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A process for treating a gas flow in the form of stack gases containing a sulphur oxide, said process comprising the steps of:

conducting the gas upwardly within a chimney-like element defining a contact zone, and treating said gas with an agent disposed on contact elements in the form of balls located in the contact zone, the volume of the agent being less than the volume of the contact elements, said treating step including releasing said contact elements in said contact zone for free and uniform downward falling movement through the rising gas flow such that all of said elements fall freely and uniformly downwardly through the rising gas flow in a path limited solely by upright side walls of the contact zone, whereby the average distance which said contact elements travel relative to the gas flow between collisions is at least five times the longest dimension of said contact elements, said elements being released at a rate such that the total volume of the contact elements is less than 20% of the volume of the contact zone.

2. A process according to claim 1, wherein the balls have a diameter between 0.05–5.0 cm. and an average density of 0.20–0.70 kg/dm$^3$.

3. A process according to claim 1, wherein the agent comprises sodium hydroxide.

4. A process according to claim 1, wherein the agent comprises hydrated lime.

5. A process according to claim 1, wherein the agent comprises limestone powder.

* * * * *